United States Patent
Tanno (10) Patent No.: US 11,541,695 B2
(45) Date of Patent: Jan. 3, 2023

(54) PNEUMATIC TIRE, TIRE WEAR INFORMATION ACQUISITION SYSTEM, AND METHOD FOR ACQUIRING WEAR INFORMATION OF PNEUMATIC TIRE

(71) Applicant: The Yokohama Rubber Co., LTD., Tokyo (JP)

(72) Inventor: Atsushi Tanno, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 236 days.

(21) Appl. No.: 16/768,048

(22) PCT Filed: Nov. 26, 2018

(86) PCT No.: PCT/JP2018/043327
§ 371 (c)(1),
(2) Date: May 28, 2020

(87) PCT Pub. No.: WO2019/107296
PCT Pub. Date: Jun. 6, 2019

(65) Prior Publication Data
US 2021/0170804 A1    Jun. 10, 2021

(30) Foreign Application Priority Data
Nov. 28, 2017   (JP) .............................. JP2017-228004

(51) Int. Cl.
*B60C 11/24* (2006.01)
*G01B 7/26* (2006.01)
(Continued)

(52) U.S. Cl.
CPC .......... *B60C 11/246* (2013.01); *B60C 11/243* (2013.01); *G01B 7/26* (2013.01);
(Continued)

(58) Field of Classification Search
CPC ............ B60C 23/0435; B60C 23/0416; B60C 23/0489; B60C 23/0488; B60C 23/0415;
(Continued)

(56) References Cited

U.S. PATENT DOCUMENTS 4,570,152 A * 2/1986 Melton ............... B60C 23/0425
73/146.2
10,647,164 B2 * 5/2020 Wei .......................... B60C 23/00
(Continued)

FOREIGN PATENT DOCUMENTS

DE         19745734 B4    7/2007
JP         2003-214808    7/2003
(Continued)

OTHER PUBLICATIONS

International Search Report for International Application No. PCT/JP2018/043327 dated Jan. 29, 2019, 4 pages, Japan.

*Primary Examiner* — Nimeshkumar D Patel
*Assistant Examiner* — Gedeon M Kidanu
(74) *Attorney, Agent, or Firm* — Thorpe North & Western (57) ABSTRACT

A tread portion of a pneumatic tire includes a columnar wear measurement magnet that has magnetic flux density or magnetic field strength formed thereby decreased due to wear thereof along with wear of tread rubber of the tread portion and a columnar reference magnet provided at a position where the columnar reference magnet is not worn with the wear of the tread rubber. The wear measurement magnet and the reference magnet extend from a tread surface side toward a tire cavity region of the pneumatic tire, and an end of the reference magnet on the tread surface side is located farther from a tread surface where the tread portion contacts the ground than an end of the wear measurement magnet on the tread surface side.

17 Claims, 8 Drawing Sheets

(51) Int. Cl.
*B60C 11/03* (2006.01)
*B60C 19/00* (2006.01)

(52) U.S. Cl.
CPC . *B60C 2011/0341* (2013.01); *B60C 2019/004* (2013.01); *B60C 2019/005* (2013.01)

(58) Field of Classification Search
CPC ............ B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 23/0493; B60C 11/24; B60C 23/0401; B60C 23/0433; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B60G 2800/984; B60T 2240/06; B60T 2240/07; B60T 2240/08; E01F 9/696; F16D 2066/001; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G01M 17/013; G02F 1/31; G02F 2203/12; H02S 10/12; H02S 20/21; H02S 20/22

See application file for complete search history.

(56) References Cited

U.S. PATENT DOCUMENTS

| | | | | |
|---|---|---|---|---|
| 2003/0159503 | A1* | 8/2003 | Mancuso | B60T 8/172 |
| | | | | 73/146 |
| 2007/0035386 | A1* | 2/2007 | Pullini | B60C 11/24 |
| | | | | 73/146 |
| 2007/0151334 | A1* | 7/2007 | Serra | B60C 23/066 |
| | | | | 73/146 |
| 2009/0078347 | A1* | 3/2009 | Niklas | B60C 11/246 |
| | | | | 73/146 |
| 2010/0276044 | A1* | 11/2010 | Heise | G01B 7/26 |
| | | | | 73/146 |
| 2014/0166168 | A1* | 6/2014 | Engel | B60C 11/243 |
| | | | | 342/385 |
| 2018/0170118 | A1* | 6/2018 | Wei | B60C 23/0493 |

FOREIGN PATENT DOCUMENTS

| | | | | |
|---|---|---|---|---|
| JP | 2003214808 A | * | 7/2003 | ........... B60C 11/243 |
| JP | 2005-153785 | | 6/2005 | |
| JP | 2005153785 A | * | 6/2005 | |
| JP | 2014-118146 | | 6/2014 | |
| WO | WO 2005/032856 | | 4/2005 | |
| WO | WO 2009/016074 | | 2/2009 | |

* cited by examiner

TIRE CIRCUMFERENTIAL DIRECTION

FIG. 4C

TIRE CIRCUMFERENTIAL DIRECTION

PNEUMATIC TIRE, TIRE WEAR INFORMATION ACQUISITION SYSTEM, AND METHOD FOR ACQUIRING WEAR INFORMATION OF PNEUMATIC TIRE

TECHNICAL FIELD

The present technology relates to a pneumatic tire provided with a magnet for acquiring wear information regarding a tread portion, a tire wear information acquisition system that acquires wear information regarding a tread portion, and a pneumatic tire wear information acquisition method for a pneumatic tire provided with a magnet for acquiring wear information regarding a tread portion.

BACKGROUND ART

Conventionally, in managing the wear of the tread portion of a pneumatic tire, a driver or a vehicle supervisor visually inspects the wear state of the tire by observing and checking the groove depth in the tread pattern or the appearance of a slip sign provided in the pneumatic tire. When the tread rubber reaches the wear limit, the pneumatic tire is replaced with a new pneumatic tire. Visually observing and checking the wear state of the pneumatic tire is not preferable in a case where the driver or the like fails to inspect or the check method is incorrect, and the tire is left even when the wear limit is reached.

On the other hand, a method for measuring wear to determine whether the wear information regarding the tread rubber of the pneumatic tire has progressed beyond the wear limit regardless of the visual perception of the driver is disclosed (Japan Unexamined Patent Publication No. 2003-214808).

The method for measuring wear identifies the degree of wear of the tread portion by detecting a change, due to wear, in the shape of a magnetic body disposed in a groove or interior of a tread portion of the pneumatic tire. For example, the change in the shape of the magnetic body is detected by measuring with a magnetic sensor the strength of the magnetic field (magnetic flux density or magnetic field strength) formed by the magnetic body made of a hard magnetic material.

The magnetic field (magnetic flux density or magnetic field strength) measured by the above method includes changes in the magnetic field strength (magnetic flux density or magnetic field strength) that accompany the use of a magnetic material over time or due to thermal degradation or the like, so the degree of wear of the tread portion could not be accurately obtained from the change in the measured magnetic field strength (magnetic flux density or magnetic field strength).

In particular, the tread rubber of a pneumatic tire generates heat and becomes high in temperature due to the rolling motion of the pneumatic tire, so a decrease in the magnetic field (magnetic flux density or magnetic field strength) of the magnetic body is unavoidable.

SUMMARY

The present technology provides: a pneumatic tire provided with a magnet capable of acquiring wear information regarding a tread portion from measured information regarding the magnetic flux density or the magnetic field strength of the magnet, the pneumatic tire being capable of acquiring highly accurate wear information without being affected by a decrease in magnetic flux density or magnetic field strength of the magnet caused by heat generation in the tread rubber of the pneumatic tire and by a decrease in magnetic flux density or magnetic field strength of the magnet due to aging; a tire wear information acquisition system capable of obtaining highly accurate wear information; and a pneumatic tire wear information acquisition method capable of acquiring highly accurate wear information regarding a tread portion.

One aspect of the present technology is a pneumatic tire provided with a magnet for acquiring wear information regarding a tread portion. The pneumatic tire includes: in the tread portion, a wear measurement magnet that is columnar and has magnetic flux density or magnetic field strength formed thereby decreased tu to wear thereof along with wear of tread rubber of the tread portion; and a reference magnet that is columnar and provided at a position where the reference magnet is not worn along with the wear of the tread rubber. The wear measurement magnet and the reference magnet extend from a tread surface side where the tread portion contacts ground toward a tire cavity region of the pneumatic tire, and an end of the reference magnet on the tread surface side is located farther from a tread surface than an end of the wear measurement magnet on the tread surface side.

It is preferable to include a wear measurement magnetic sensor that detects a magnetic flux density or a magnetic field strength of the wear measurement magnet and a reference magnetic sensor that detects a magnetic flux density or a magnetic field strength of the reference magnet.

In this case, the wear measurement magnetic sensor and the reference magnetic sensor are preferably provided on a protrusion made from a non-magnetic material protruding into the tire cavity region from a tire inner surface facing the tire cavity region.

The wear measurement magnet and the reference magnet preferably extend from the tread surface side toward the tire cavity region, and terminate before reaching a carcass ply of the pneumatic tire; and the wear measurement magnetic sensor and the reference magnetic sensor are provided fixed to an inner surface of the pneumatic tire facing the tire cavity region.

The wear measurement magnet and the reference magnet are preferably provided at different positions in a tire circumferential direction and at an identical position in a tire lateral direction.

A separation distance W along the tire circumferential direction between the wear measurement magnet and the reference magnet is preferably greater than two times a length L of the longer of the lengths of the wear measurement magnet and the reference magnet.

The reference magnet is disposed such that an end of the reference magnet on the tread surface side is not exposed to the tread surface, even when the tread surface reaches a wear limit curve that is a profile line of the tread surface where a wear indicator provided on the pneumatic tire begins to be exposed, while the tread rubber is worn, maintaining a profile shape of an unworn tread surface of when the pneumatic tire is new.

A circumferential main groove extending in a tire circumferential direction is provided in the tread portion, and the reference magnet is disposed such that an end of the reference magnet on the tread surface side is not exposed to the tread surface, even when the tread surface reaches a wear limit curve that is a profile line of the tread surface when the tread surface is worn until a groove depth of the circumferential main groove reaches 50% of a groove depth of an unworn circumferential main groove, while maintaining a profile shape of an unworn tread surface of when the pneumatic tire is new.

A portion from the end of the reference magnet on the tread surface side to the tread surface is preferably formed from a rubber material that is identical to that of the tread rubber.

The wear measurement magnet and the reference magnet pass by an outer side of a belt layer in a tire lateral direction and extend toward the tire cavity region of the pneumatic tire.

The wear measurement magnet and the reference magnet are bonded magnets having a configuration in which magnet powder is included in rubber material that is identical to that of the tread rubber.

A ratio L/D is 3 to 15, the D being a maximum diameter of the wear measurement magnet and of the reference magnet, and the L being an extending length of the wear measurement magnet and of the reference magnet.

The tread portion is provided with a plurality of shoulder lug grooves that extend inward in a tire lateral direction from a pattern end of the tread portion and are spaced apart in a tire circumferential direction; the wear measurement magnet and the reference magnet are provided sandwiching at least one of the plurality of shoulder lug grooves in the tire circumferential direction; and when a distance between two shoulder lug grooves adjacent to the wear measurement magnet and to the reference magnet in the tire circumferential direction is Y0, the wear measurement magnet and the reference magnet are respectively provided at positions separated from each of the two adjacent shoulder lug grooves by a distance 0.3 to 0.7 times the distance Y0.

Another aspect of the present invention is a tire wear information acquisition system. The tire wear information acquisition system includes: the pneumatic tire; and an acquisition device that acquires wear information regarding the tread from a detection signal of the wear measurement magnetic sensor and a detection signal of the reference magnetic sensor. The detection signal of the wear measurement magnetic sensor includes first information including a decrease in magnetic flux density or magnetic field strength of the wear measurement magnet due to the wear, aged deterioration, and thermal degradation of the wear measurement magnet. The detection signal of the reference magnetic sensor includes second information including a decrease in magnetic flux density or magnetic field strength of the reference magnet due to aged deterioration and thermal degradation of the reference magnet. The acquisition device acquires wear information regarding the tread rubber by removing a decrease in magnetic flux density or magnetic field strength of the wear measurement magnet due to the aged deterioration and the thermal degradation of the wear measurement magnet from a decrease in magnetic flux density or magnetic field strength of the wear measurement magnet by using the first information and the second information, and extracting information regarding the decrease in magnetic flux density or magnetic field strength of the wear measurement magnet due to the wear of the wear measurement magnet.

The acquisition device preferably extracts information regarding the decrease in magnetic flux density or magnetic field strength due to the wear of the wear measurement magnet by dividing a detection signal of the wear measurement magnetic sensor by a computation result of arithmetic operations that are performed on the detection signal of the reference magnetic sensor with a constant value.

Another aspect of the present technology is a method for manufacturing a pneumatic tire provided with a magnet for acquiring wear information regarding a tread portion. The manufacturing method includes: a step of manufacturing a tire by vulcanizing a green tire using a tire mold having pins protruding so that magnet mounting holes for embedding magnets in the tread rubber of the tread portion are formed in the tread rubber; and a step of mounting a wear measurement magnet and a reference magnet in the magnet mounting holes of the manufactured tire.

In the step of mounting the reference magnet in the magnet mounting hole, preferably a combined body in which a rubber material member is mounted on an end of the reference magnet is mounted in the magnet mounting hole.

In the step of mounting the wear measurement magnet and the reference magnet in the magnet mounting holes, cover members preferably cover the outer periphery of each of the wear measurement magnet and the reference magnet, and preferably the integrated combination is mounted in the magnet mounting hole so that the cover member comes in contact with the inner wall of the magnet mounting hole inside the magnet mounting hole.

The cover member is preferably a rubber material or a resin material having identical wear characteristics to that of the tread rubber.

Another aspect of the present technology is a pneumatic tire wear information acquisition method for a pneumatic tire comprising a magnet for acquiring wear information regarding a tread portion.

The tread portion includes a wear measurement magnet that is columnar and has magnetic flux density or magnetic field strength formed thereby decreased due to wear thereof along with wear of tread rubber of the tread portion and a reference magnet that is columnar and provided at a position where the reference magnet is not worn along with the wear of the tread rubber, the wear measurement magnet and the reference magnet extend from a tread surface side where the tread portion contacts ground toward a tire cavity region of the pneumatic tire, and an end of the reference magnet on the tread surface side is located farther from a tread surface than an end of the wear measurement magnet on the tread surface side, the pneumatic tire wear information acquisition method including the steps of: continuously or intermittently measuring a magnetic flux density or a magnetic field strength of the wear measurement magnet and a magnetic flux density or a magnetic field strength of the reference magnet; and acquiring wear information regarding the tread rubber by extracting information regarding a decrease in magnetic flux density or magnetic field strength due to wear of the wear measurement magnet from information regarding the magnetic flux density or the magnetic field strength of the wear measurement magnet by referencing information regarding the magnetic flux density or the magnetic field strength of the reference magnet.

In the acquiring of the wear information regarding the tread rubber, information regarding the decrease in magnetic flux density or magnetic field strength due to wear of the wear measurement magnet is preferably extracted by dividing information regarding the magnetic flux density or the magnetic field strength of the wear measurement magnet by a computation result of arithmetic operations that are performed on information regarding the magnetic flux density or the magnetic field strength of the reference magnet with a constant value.

With the pneumatic tire, the tire wear information acquisition system, and the pneumatic tire wear information acquisition method described above, it is possible to obtain wear information with high accuracy without being affected by a decrease in the magnetic flux density or the magnetic field strength of the magnets due to heat generation of the tread rubber of the pneumatic tire, or a decrease in magnetic flux density or magnetic field strength of the magnets due to changes over time.

DETAILED DESCRIPTION

A pneumatic tire, a tire wear information acquisition system, and a pneumatic tire wear information acquisition method of an embodiment will be described in detail below.

In the present specification, "tire lateral direction" refers to the direction of the center axis of rotation of a pneumatic tire. "Tire circumferential direction" refers to a rotation direction in which a tread surface rotates, when the tire rotates about the center axis of rotation of the tire. "Tire radial direction" refers to the direction radiating from the center axis of rotation of the tire. "Outward in the tire radial direction" refers to the direction away from the tire rotation center axis. "Inward in the tire radial direction" refers to the direction towards the center axis of rotation of the tire.

Figure 1:
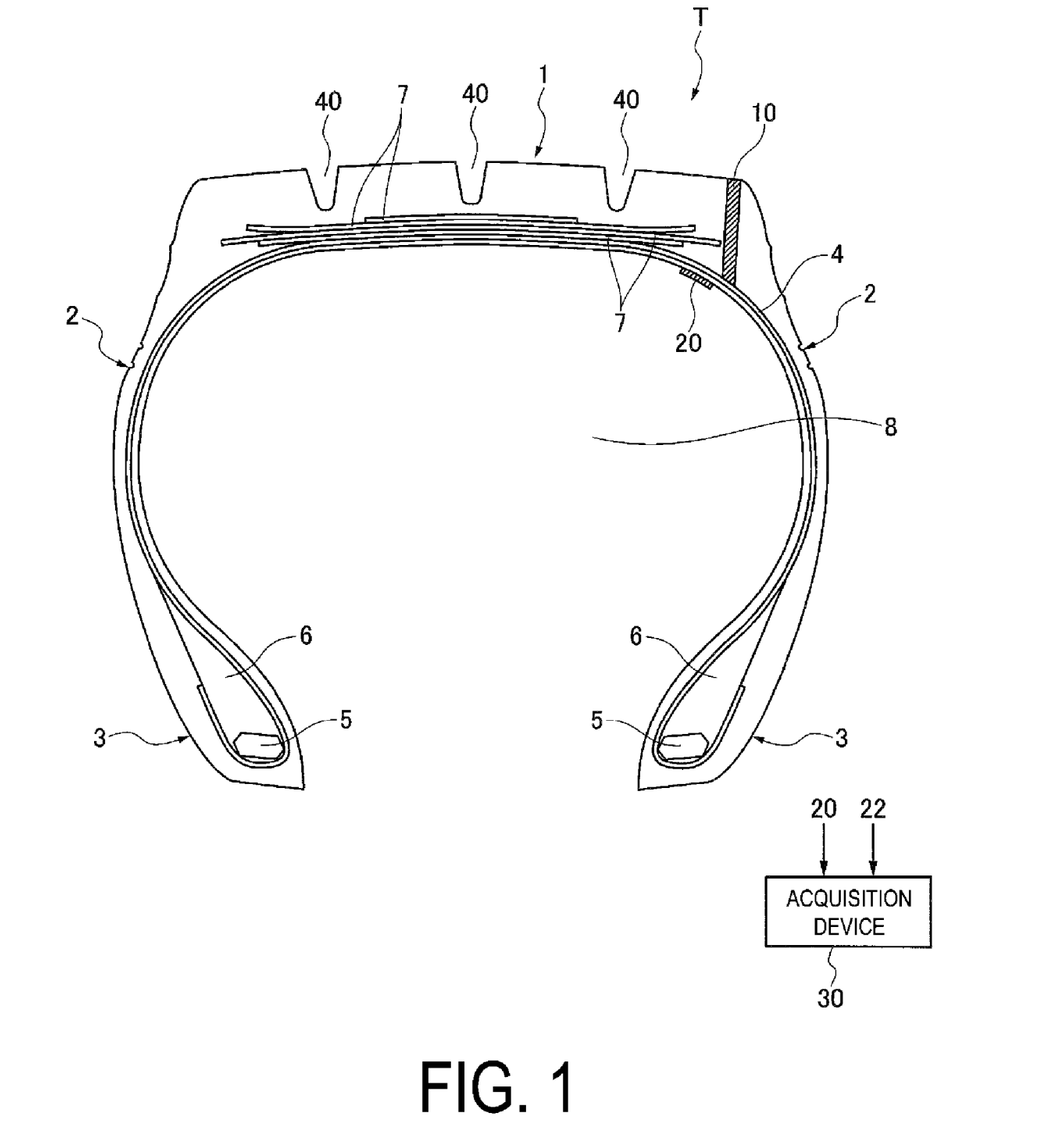
FIG. 1 is a profile cross-sectional view of a pneumatic tire of an embodiment.

FIG. 1 is a profile cross-sectional view of a pneumatic tire (hereinafter, simply referred to as "tire") T of an embodiment. As illustrated in FIG. 1, the pneumatic tire includes an annular tread portion 1 extending in the tire circumferential direction, a pair of sidewall portions 2, 2 disposed on both sides of the tread portion 1, and a pair of bead portions 3, 3 disposed inward of the sidewall portions 2, 2 in the tire radial direction.

A carcass ply 4 is mounted between the pair of bead portions 3, 3. The carcass layer 4 includes a plurality of reinforcing cords extending in the tire radial direction and folded back around bead cores 5 disposed in each of the bead portions 3 from an inner side of the tire to an outer side of the tire. The reinforcing cords of the carcass ply 4 are, for example, made of steel, the diameter of the reinforcing cords is 0.5 to 1.5 mm, for example, and the reinforcing cord count is 15 to 25 (number per 50 mm), for example. A bead filler 6 having a triangular cross-sectional shape formed from rubber composition is disposed on the outer circumference of the bead core 5.

On the other hand, a plurality of belt layers 7 are embedded radially outward in the tire radial direction of the carcass layer 4 in the tread portion 1. The belt layers 7 each include a plurality of reinforcing cords that are inclined with respect to the tire circumferential direction, the reinforcing cords being arranged in the different layers in a criss-cross manner. In the belt layers 7, the inclination angle of the reinforcing cords with respect to the tire circumferential direction ranges from, for example, 10° to 60°. Steel cords are preferably used as the reinforcing cords of the belt layers 7.

Figure 2A:
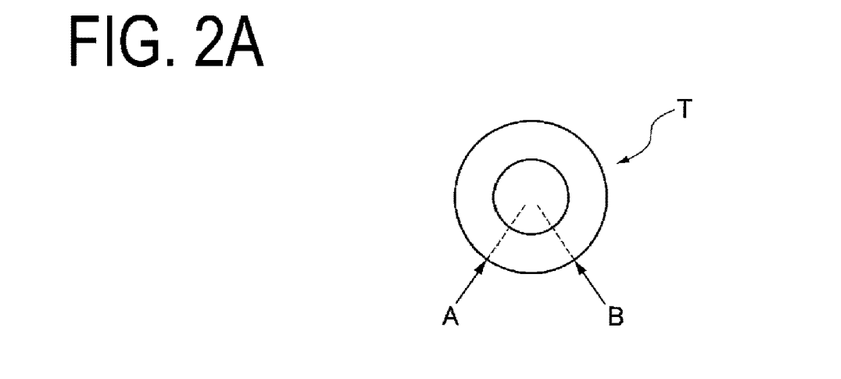
FIGS. 2A to 2C are explanatory diagrams of a wear measurement magnet and a reference magnet provided in a tire T of an embodiment.
Figure 2B:
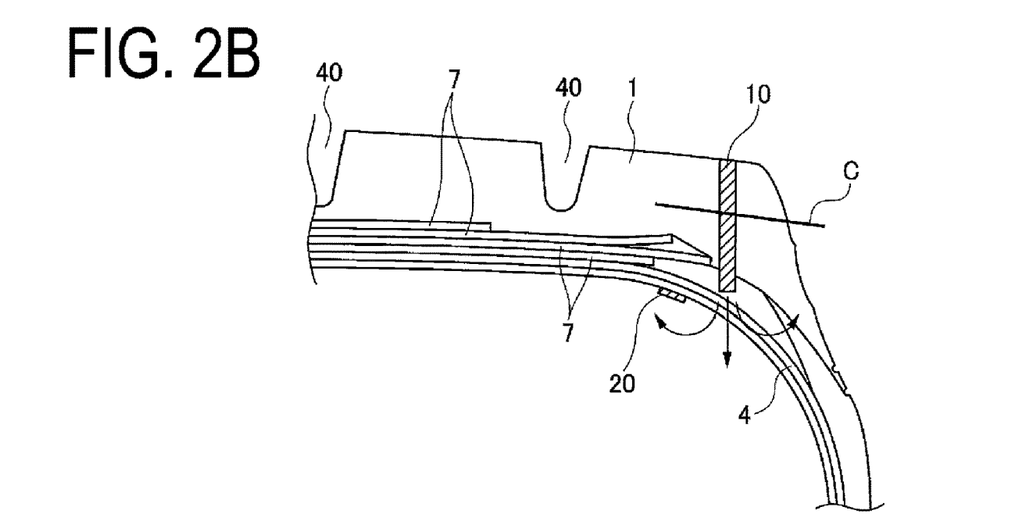
Figure 2C:
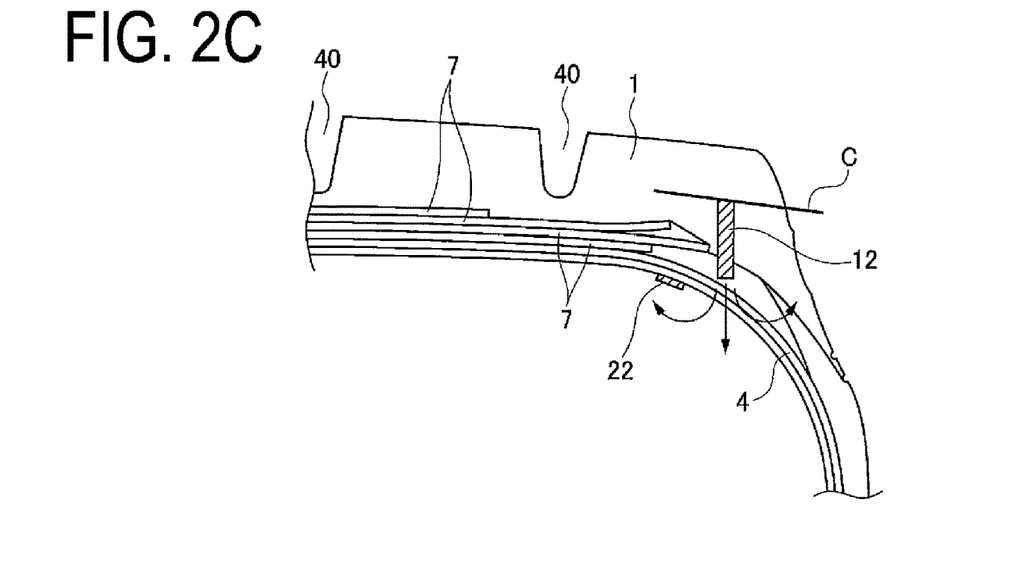

Such a tire T includes a magnet for acquiring wear information regarding the tread portion 1. FIGS. 2A to 2C are explanatory diagrams of a wear measurement magnet 10 and a reference magnet 12 provided in a tire T of an embodiment.

The tire T includes a wear measurement magnet 10 that, from a change in magnetic flux density or magnetic field strength, is capable of knowing the wear state of the tread rubber of the tread portion 1, and a reference magnet 12 for compensating for a decrease in magnetic flux density or magnetic field strength due to changes over time and heat generation in the wear measurement magnet 10. Furthermore, the tire T includes magnetic sensors 20, 22 that detect the magnetic flux density or magnetic field strength of the wear measurement magnet and the reference magnet. The detection signals of the magnetic sensors 20, 22 are transmitted to an acquisition device 30 that acquires wear information in a wired or wireless manner. As a result, the acquisition device 30 is capable of knowing the wear state of the tread rubber of the tire T. The tire 10 will be described in detail below.

(Wear Measurement Magnet, Reference Magnet)

A wear measurement magnet 10 (see FIG. 1) and a reference magnet 12 (see FIG. 2C) are provided in the tread portion 1. The wear measurement magnet 10 (see FIG. 1) and the reference magnet 12 extend from the tread surface side where the tread portion 1 contacts the ground toward the tire cavity region 8 of the tire T. The tire cavity region 8 is a space region that is filled with air and is defined by the tire T and the wheel when the tire T is mounted on the wheel.

The wear measurement magnet 10 is a columnar magnet having a magnetic flux density or magnetic field strength that is decreased due to wear of the tread rubber of the tread portion 1. In the embodiment illustrated in FIG. 1, when new, the wear measurement magnet 10 is exposed flush with the tread surface of the tread rubber, and thus wears together with the wear of the tread rubber. The wear measurement magnet 10 extends from the tread surface side toward the tire cavity region 8, and terminates before reaching the carcass ply 4.

As illustrated in FIG. 2C, the reference magnet 12 is a columnar magnet provided at a position where there is no wear due to wear of the tread rubber of the tread portion 1. The reference magnet 12 extends from the tread surface side toward the tire cavity region 8, and terminates before reaching the carcass ply 4. The reference magnet 12 of the embodiment illustrated in FIG. 2C is provided in a position such as a position that is not exposed even when the tread surface of the worn tread rubber reaches a wear limit line C. The wear limit line C refers to, for example, a profile line of the tread surface that starts to become exposed when a wear indicator provided in the groove of the tread pattern wears while maintaining the profile shape of the tread surface when new. Alternatively, in the case of studless tires, the wear limit line C refers to the profile line of the tread surface when worn until the groove depth of the tread pattern is worn while maintaining the profile shape of the tread surface when new; for example, refers to the profile line of the tread surface when worn to a depth of 50% with respect to the groove depth of the circumferential main groove 40 (see FIG. 1) extending in the tire circumferential direction. Accordingly, even when the tread surface reaches a wear limit curve C, which is a profile line of the tread surface where a wear indicator provided on the tire T begins to be exposed, while the tread rubber wears, maintaining a profile shape of an unworn tread surface of when new, the reference magnet 12 is preferably disposed such that the edge of the reference magnet 12 on the tread surface side is not exposed to the tread surface. Moreover, when the tire T is a studless tire, it is also preferable that the reference magnet 12 is arranged so that the end of the reference magnet 12 on the tread surface side is not exposed to the tread surface, when the tread surface reaches a wear limit curve C, which is a profile line of the tread surface when the tread surface is worn up until a groove depth of the circumferential main groove 40 reaches 50% of a groove depth of an unworn circumferential main groove, while maintaining a profile shape of an unworn tread surface of when the tire T is new.

As illustrated in FIG. 2C, the reference magnet 12 is not exposed on the tread surface. Rubber is provided in the portion from the end on the tread surface side to the tread surface. Preferably, from the aspect of keeping the deformation of the tread rubber substantially the same as the deformation of other portions on the tire circumference without the reference magnet 12, the rubber is composed of a rubber material identical to that of the tread rubber constituting the tread portion 1.

By forming the shape of the wear measurement magnet 10 and the reference magnet 12 in a columnar shape extending in one direction, the permeance coefficient increases, and it is possible to suppress a decrease in magnetic flux density or magnetic field strength due to change over time and thermal degradation.

Accordingly, the end of the reference magnet 12 on the tread surface side is located farther from the tread surface than the end of the wear measurement magnet 10 on the tread surface side. As illustrated in FIG. 2B, the wear measurement magnet 10 is in a form that is exposed on the tread surface of the tread portion 1 when new; however, may also be in a form that is not exposed on the tread surface when new and is exposed on the tread surface from a point in time after a certain amount of wear has progressed.

The wear measurement magnet 10 and the reference magnet 12 are configured so as to pass by the outer side of the end portion in the tire lateral direction of the belt layer 7 and extend to the vicinity of the carcass ply 4 on the side of the tire cavity region 10*a*. In this way, the wear measurement magnet 10 and the reference magnet 12 are configured to pass by the outer side of the end portion of the belt layer 7 in order to suppress the shielding of the magnetic fields of the wear measurement magnets 10 and the reference magnets 12 by the belt layer 7.

As illustrated in FIG. 2A, the wear measurement magnet 10 and the reference magnet 12 are provided at different positions in the tire circumferential direction. The wear measurement magnet 10 illustrated in FIG. 2B is provided at a position A on the tire circumference illustrated in FIG. 2A, and the reference magnet 12 is provided at a position B on the tire circumference illustrated in FIG. 2A.

The wear measurement magnet 10 and the reference magnet 12 are, for example, bonded magnets. A bonded magnet is a flexible magnet in which fine particles obtained by pulverizing a magnet such as a neodymium magnet or a ferrite magnet are kneaded into rubber or plastic. The use of a bonded magnet in the wear measurement magnet 10 and the reference magnet 12 is preferable from the aspect of allowing deformation of the tread rubber similar to other portions of the tread portion 1 without the wear measurement magnet 10 and the reference magnet 12. According to an embodiment, it is particularly preferable from the aspect of enabling a deformation identical to that of the other parts of the tread portion 1 without the wear measurement magnet 10 and the reference magnet 12 that the rubber material used for the wear measurement magnet 10 and the reference magnet 12 be a rubber material identical to that of the tread rubber of the tread portion 1. Moreover, from the aspect of making the decrease in magnetic flux density or magnetic field strength due to change over time and heat generation identical, it is preferable that the rubber material used for the wear measurement magnet 10 and the reference magnet 12 be identical.

Also, the cross-sectional shape of the wear measurement magnet 10 and the reference magnet 12 is not limited to a shape such as a square, a circle, an oval, or the like; however, according to an embodiment, the cross-sectional shape and the cross-sectional area are preferably identical between the wear measurement magnet 10 and the reference magnet 12. Accordingly, the demagnetization characteristics due to change over time and heat generation of the wear measurement magnet 10 and the reference magnet 12 can be set to the same extent.

Note that the cross-sectional shape and cross-sectional area of the wear measurement magnet 10 and the reference magnet 12 may be constant or varied along the extension direction of the wear measurement magnet 10 and the reference magnet 12.

Figure 3A:
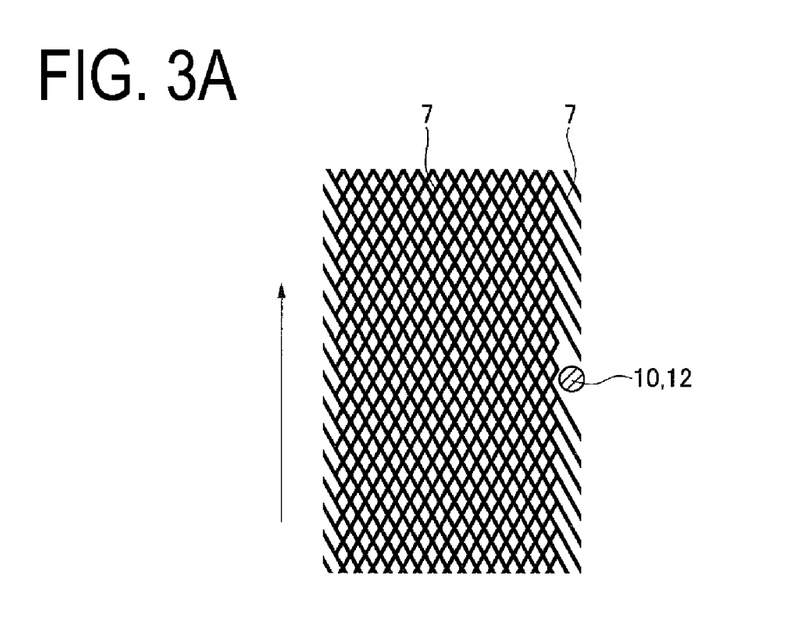
FIGS. 3A and 3B are explanatory diagrams of an example arrangement of a wear measurement magnet and a reference magnet of an embodiment.
Figure 3B:
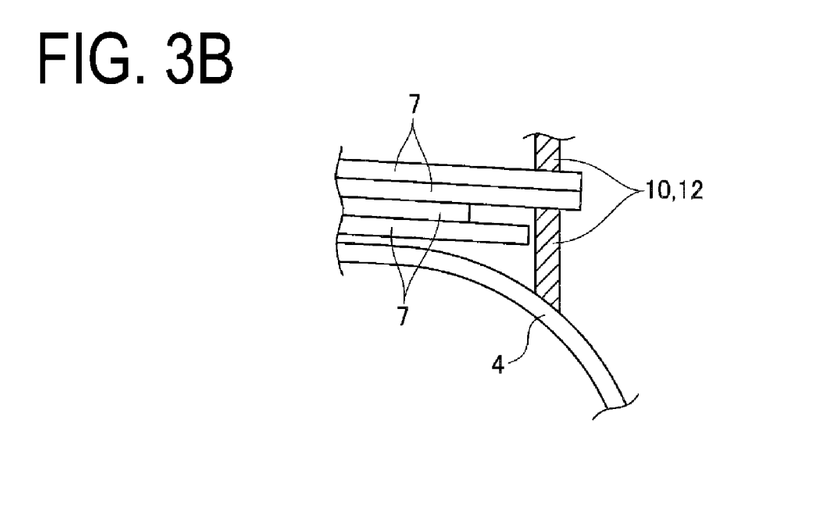

FIGS. 3A and 3B are explanatory diagrams of an example arrangement of a wear measurement magnet 10 and a reference magnet 12 of an embodiment. As illustrated in FIG. 3A, a part of the end portion of the belt layer 7 is a notched portion and can be configured so that the wear measurement magnet 10 and the reference magnet 12 pass by and extend to the vicinity of the carcass ply 4 on the side of the tire cavity region 10*a*.

Moreover, as illustrated in FIG. 3B, the wear measurement magnet 10 and the reference magnet 12 may be divided by the belt layer 7. Even when divided, the belt layer 7 includes steel cords, so the belt layer 7 may allow magnetism to pass, and serves the function of the wear measurement magnet 10 and the reference magnet 12.

Figure 4A:
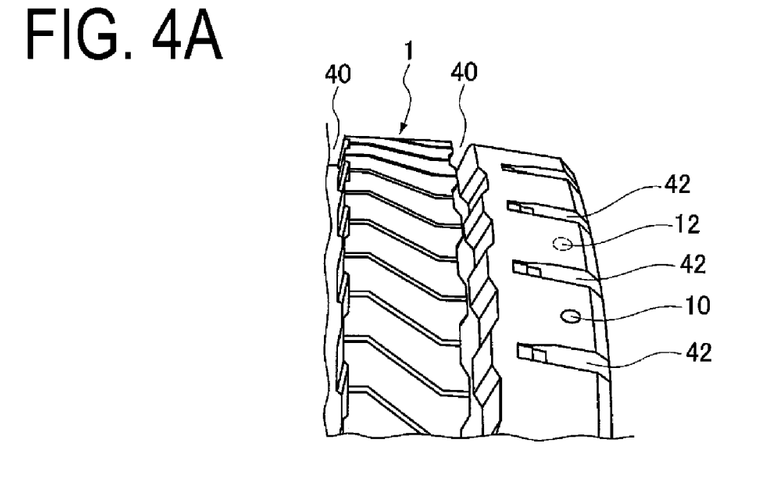
FIGS. 4A to 4C are explanatory diagrams of an example arrangement of a wear measurement magnet and a reference magnet of an embodiment.
Figure 4B:
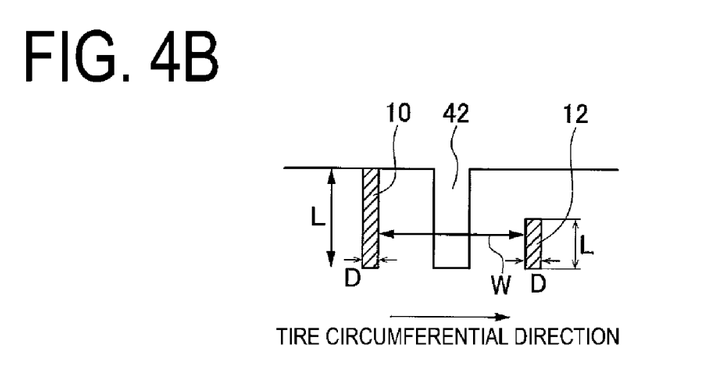
Figure 4C:
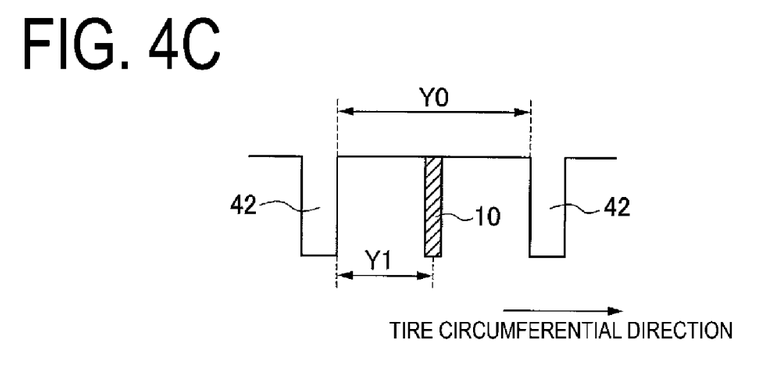

FIGS. 4A to 4C are explanatory diagrams of an example arrangement of a wear measurement magnet 10 and a reference magnet 12 of an embodiment.

The tread portion 1 illustrated in FIG. 4A includes a circumferential main groove 40 extending in the tire circumferential direction, and shoulder lug grooves 42 provided in the shoulder regions of the tread portion 1 and extending inward in the tire lateral direction from pattern ends. A plurality of shoulder lug grooves 42 are provided so as to be separated from each other in the tire circumferential direction.

In such a tread pattern, the wear measurement magnet 10 and the reference magnet 12 are provided in the shoulder regions in which the shoulder lug grooves 42 are provided.

In this case, as in the embodiment illustrated in FIG. 4B, the wear measurement magnet 10 and the reference magnet 12 are provided so as to sandwich a shoulder lug groove 42 in the tire circumferential direction. In FIG. 4B, the wear measurement magnet 10 and the reference magnet 12 are provided so as to sandwich one shoulder lug groove 42 in the tire circumferential direction; however, according to an embodiment, both the wear measurement magnet 10 and the reference magnet 12 may be provided so as to sandwich two or more shoulder lug grooves 42 in the tire circumferential direction.

The separation distance W along the tire circumferential direction between the wear measurement magnet 10 and the reference magnet 12 is preferably greater than two-times the length L of the longer of the lengths of the wear measurement magnet 10 and the reference magnet 12 in the extension direction. In the case of the embodiment described above, the length in the extension direction of the wear measurement magnet 10 is longer than the length in the extension direction of the reference magnet 12, so the length L is the length in the extension direction of the wear measurement magnet 10. By configuring the separation distance W to be greater than two-times the length L in this way, the magnetic fields of the wear measurement magnet 10 and the reference magnet 12 are mixed, and it is possible to suppress the measurement result of the magnetic flux density or the magnetic field strength from becoming inaccurate.

At this time, as illustrated in FIG. 4C, when the distance between two shoulder lug grooves 42, 42 adjacent to the wear measurement magnet 10 and to the reference magnet 12 in the tire circumferential direction is Y0, the wear measurement magnet 10 is provided at a position separated from each of the two adjacent shoulder lug grooves 42, 42 by a distance 0.3 to 0.7 times the distance Y0. In other words, the distance Y1 from the edge of the shoulder lug groove 42 to the center position of the wear measurement magnet 10 is 0.3 times to 0.7 times the distance Y0. The reference magnet 12 is also arranged in the same manner as the arrangement position of the wear measurement magnet 10. In other words, the distance from the edge of the shoulder lug groove 42 to the center position of the reference magnet 12 is 0.3 times to 0.7 times the distance Y0. Due to such an arrangement, the wear information regarding the tread rubber obtained from the information regarding a decrease in the magnetic flux density or the magnetic field strength of the wear measurement magnet 10 and the reference magnet 12 may be less susceptible to uneven wear and chipping (chips) where the amount of wear locally increases, which is likely to occur in the tread rubber in the vicinity of the shoulder lug grooves 42.

In particular, the ratios of the distances from the edge of the shoulder lug groove 42 to the distance Y0 for the wear measurement magnet 10 and the reference magnet 12 are identical (the difference in ratios is 0.1 or less).

The wear measurement magnet 10 and the reference magnet 12 are preferably provided at different positions in the tire circumferential direction and at an identical position in the tire lateral direction. Accordingly, thermal degradation due to heat generated by the tread rubber and received by the wear measurement magnet 10 and the reference magnet 12 may be set to an identical degree, so when acquiring wear information regarding the tread rubber from the decrease in the magnetic flux density or the magnetic field strength of the wear measurement magnet 10, the decrease in the magnetic flux density or the magnetic field strength of the reference magnet 12 can be effectively used as reference information.

When the maximum diameter of the wear measurement magnet 10 and of the reference magnet 12 is D (see FIG. 4B), and the extending length of the wear measurement magnet 10 and of the reference magnet 12 is L (see FIG. 4B), the ratio L/D is preferably 3 to 15. When the ratio L/D is less than 3, the magnetic flux density or the magnetic field strength tends to decrease. When the ratio L/D is increased, the length L is limited due to the limitation of the thickness of the tread portion 1 of the tire T. For this reason, when the ratio L/D is greater than necessary, the maximum diameter D must be reduced; however, when the maximum diameter D is reduced, the magnetic flux density or the magnetic field strength becomes smaller, and the measuring accuracy of the magnetic sensor 20, 22 decreases. In this regard, the ratio L/D is 15 or less. Here, the maximum diameter refers to a circular diameter or equivalent diameter when this non-circular cross-sectional shape is replaced with a circular shape with an equal cross-sectional area. The maximum diameter D, for example, is 1 to 10 mm. The length L, for example, is 2 to 8 mm.

(Magnetic Sensor)

The magnetic sensor 20 (see FIG. 1 and FIG. 2B) is a sensor that detects the magnetic flux density or magnetic field strength of the wear measurement magnet 10. The magnetic sensors 20, 22 of this embodiment are mounted in the tire T; however, in another embodiment may not be mounted in the tire T. The magnetic sensor 22 (see FIG. 2C) is a sensor that senses the magnetic flux density or magnetic field strength of the reference magnet 12. The magnetic sensors 20, 22 may use, for example, a Hall element utilizing the Hall effect, a magnetoresistive effect element, or a magnetic impedance element, a GSR (GHz-Spin-Rotation) sensor element, a magnetostrictive sensor element, and the like. In particular, it is preferable to use a Hall element capable of detecting magnetic flux density or magnetic field strength with high accuracy. A magnetic sensor is provided, for example, on a substrate, and the substrate is secured to the tire T. In this case, a drive power source (battery) for the magnetic sensors 20, 22 may be provided on the substrate. The drive power source of the magnetic sensors 20, 22 may not necessarily be provided on the substrate, and may be provided in the vicinity of the magnetic sensors 20, 22, or may be provided external to the tire T.

The magnetic sensors 20, 22 are fixed to the tire inner surface opposing the tire cavity region 8 in the embodiment illustrated in FIGS. 2B and 2C. Fixing of the magnetic sensors 20, 22 to the tire inner surface is not particularly limited, and, for example, the magnetic sensors 20, 22 may be fixed to the tire inner surface via a surface fastener that is mounted on the tire inner surface when the tire T is manufactured.

In accordance with another embodiment, the magnetic sensors 20, 22 are preferably provided on a protrusion made of a non-magnetic material (for example, a rubber material or a resin material) protruding into the tire cavity region from a tire inner surface opposing the tire cavity region. In other words, the magnetic sensors 20, 22 are provided on a pedestal fixed to the tire inner surface. The presence of a magnetic material such as a metal member near the placement position of the magnetic sensors 20, 22 is not preferable from the aspect of the measuring accuracy of the magnetic sensors 20, 22. As a result, when the magnetic sensors 20, 22 are disposed on the tire inner surface, the magnetic sensors 20, 22 are attached via a protrusion (pedestal), and the measuring accuracy may be increased by separating the magnetic sensors 20, 22 from the carcass ply 4 using steel cords.

As illustrated in FIGS. 2B and 2C, the magnetic sensor 20 is provided in the vicinity of the wear measurement magnet 10, and the magnetic sensor 22 is provided in the vicinity of the reference magnet 12. In a case where the wear measurement magnet 10 and the reference magnet 12 are provided at an identical position in the tire lateral direction, the magnetic sensors 20, 22 are also preferably provided at an identical position in the tire lateral direction. At this time, the magnetic sensors 20, 22 are preferably provided at an identical position in the tire circumferential direction of the wear measurement magnet 10 or the reference magnet 12.

Note that there is no metal member of the tire T that may cross the magnetic field of the magnetic sensors 20, 22 and the inner ends of the wear measurement magnet 10 and the reference magnet 12 in the tire radial direction other than the reinforcing cords of the carcass ply 4. Even in a case where the reinforcing cords of the metal member above cross the magnetic flux or the magnetic field, the diameter of the reinforcing cords is 0.5 to 1.5 mm, and in a case where the cord count (number per 50 mm) of the reinforcing cords is 16 to 25, the magnetic sensors 20, 22 are able to detect the magnetic flux density or magnetic field strength of the wear measurement magnet 10 and the reference magnet 12 without hindrance.

Figure 5:
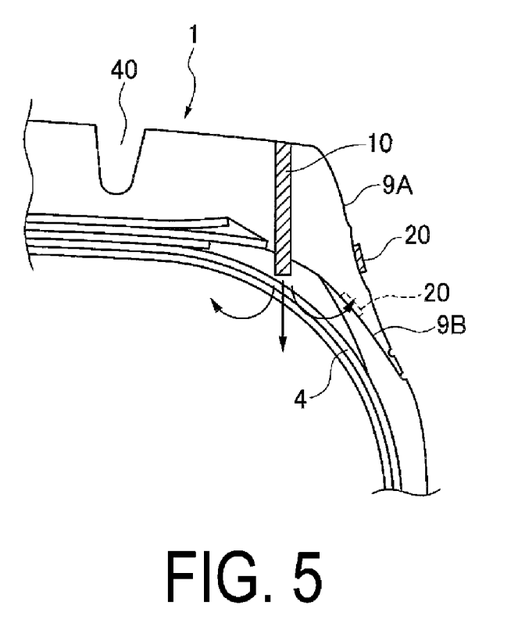
FIG. 5 is a diagram illustrating an example of another arrangement of a magnetic sensor of an embodiment.

FIG. 5 is a diagram illustrating an example of other arrangements of a magnetic sensor 20 in an embodiment. As illustrated in FIG. 5, the magnetic sensor 20 may be provided in a buttress portion 9A, which is a connecting portion of the tread portion 1 and the sidewall, on a tire outer surface opposite the tire inner surface. The magnetic sensor 20 may also be provided within tire T. As illustrated by the dotted line in FIG. 5, the side rubber forming the sidewall and the tread rubber forming the tread portion 1 may also be provided. The magnetic sensor 22 may also be provided in the buttress portion 9A or the boundary face 9B. In other words, the magnetic sensors 20, 22 may be provided on the side on which the wear measurement magnet 10 and the reference magnet 12 are disposed with the carcass ply 4 as a boundary. In a case where steel cords are used as a wire material in the carcass ply 3, from the aspect that the magnetic flux density or the magnetic field strength may be less affected by the steel cords, the magnetic sensors 20, 22 are preferably provided on the same side as the wear measurement magnet 10 and the reference magnet 12 with the carcass ply 4 as a boundary.

(Acquisition Device)

The acquisition device 30, via wired or wireless transmission, receives a detection signal indicating the information regarding the magnetic flux density or magnetic field strength detected by the magnetic sensors 20, 22.

Figure 6A:
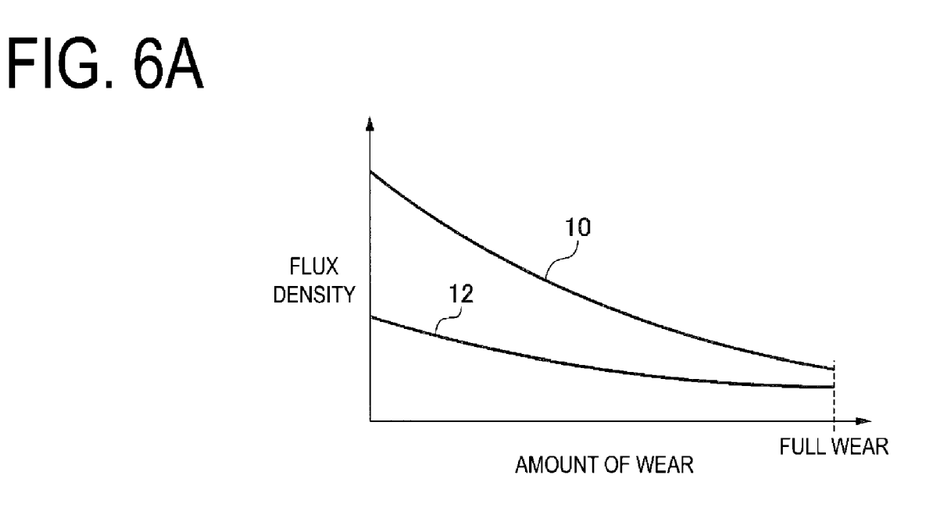
FIG. 6A is a diagram schematically illustrating a decrease in magnetic flux density of a wear measurement magnet and a reference magnet of an embodiment.

The detection signal received by the magnetic sensor 20, in addition to information regarding a decrease in the magnetic flux density or magnetic field strength due to wear of the wear measurement magnet 10, includes information regarding a decrease in magnetic flux density or magnetic field strength due to thermal degradation or change over time. On the other hand, the detection signal received by the magnetic sensor 22 includes information regarding a decrease in magnetic flux density or magnetic field strength due to thermal degradation of the reference magnet 12 or due to change over time. Therefore, the amount of wear of the tread rubber increases as the usage time of the tire T increases, while the magnetic flux density or magnetic field strength of the wear measurement magnets 10 and the reference magnets 12 decreases. FIG. 6A is a diagram schematically illustrating a decrease in magnetic flux density of a wear measurement magnet 10 and a reference magnet 12 of an embodiment. As illustrated in FIG. 6A, the magnetic flux density of the wear measurement magnet 10 and the reference magnet 12 decreases as the amount of wear increases (usage time increases). The magnetic field strength also decreases in the same manner as the magnetic flux density. In FIG. 6A, the reference signs 10, 12 are lines indicating a change in the magnetic flux density of the wear measurement magnet 10 and the reference magnet 12. The reason the lines of magnetic flux density of the wear measurement magnet 10 and the reference magnet 12 are different is because the length in the extension direction of each magnet is different and the magnetic flux density varies. The acquisition device 30 can reference information regarding the magnetic flux density or the magnetic field strength acquired as a detection signal from the magnetic sensor 20 and information regarding the magnetic flux density or magnetic field strength acquired as a detection signal from the magnetic sensor 22 to extract information regarding a decrease in magnetic flux density or magnetic field strength due to wear of the wear measurement magnet 10. More specifically, the acquisition device 30 extracts information regarding the decrease in magnetic flux density or magnetic field strength due to wear of the wear measurement magnet 10 by dividing information regarding the magnetic flux density or the magnetic field strength acquired as a detection signal from the magnetic sensor 20 by a computation result of arithmetic operations performed, with a predetermined constant value, on information regarding the magnetic flux density or the magnetic field strength acquired as a detection signal from the magnetic sensor 22.

Figure 6B:
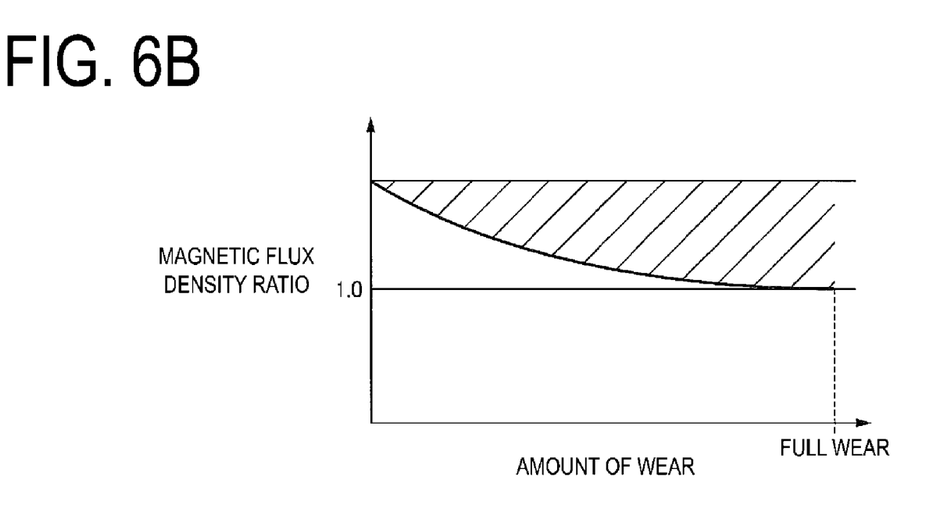
FIG. 6B is a diagram schematically illustrating an example of a change in the flux density ratio of a wear measurement magnet due to wear with respect to a reference magnet.

FIG. 6B is a diagram schematically illustrating an example of a change in the flux density ratio of the wear measurement magnet 10 due to wear with respect to the reference magnet 12. As illustrated in FIG. 6B, the magnetic flux density of the wear measurement magnet 10 has been illustrated to vary even though there is no change in the magnetic flux density of the reference magnet 12. The magnetic field strength ratio of the wear measurement magnet 10 due to wear to the reference magnet 12 also indicates a similar change in the flux density ratio described above. Therefore, the change in magnetic flux density or magnetic field strength due to wear of the wear measurement magnet 10 represents a change in the magnetic flux density of the wear measurement magnet 10. Accordingly, as illustrated in FIG. 6B, the acquisition device 30 acquires wear information regarding the tread rubber using a correspondence table representing the relationship between a decrease in the predetermined magnetic flux density or the magnetic field strength and the amount of wear of the tread rubber.

In this way, by using the information regarding the magnetic flux density or the magnetic field strength of the wear measurement magnet 10 and the reference magnet 12 provided in the tire T, it is possible to acquire the wear information regarding the tread rubber with high accuracy without being affected by a decrease in the magnetic flux density or the magnetic field strength of the magnets due to the heat generation of the tread rubber of the tire T, or by a decrease in the magnetic flux density or the magnetic field strength of the magnets due to changes over time.

Accordingly, in the tire T and the tire wear information acquisition system provided with the acquisition device 30, first, the magnetic flux density or the magnetic field strength of the wear measurement magnet 10 and the magnetic flux density or magnetic field strength of the reference magnet 12 are continuously or intermittently measured. By referencing the information regarding the magnetic flux density or the magnetic field strength of the reference magnet 12 from the information regarding the measured magnetic flux density or magnetic field strength of the wear measurement magnet 10, information regarding a decrease in magnetic flux density or magnetic field strength due to wear of the wear measurement magnet 10 is extracted to acquire wear information regarding the tread rubber.

Figure 7:
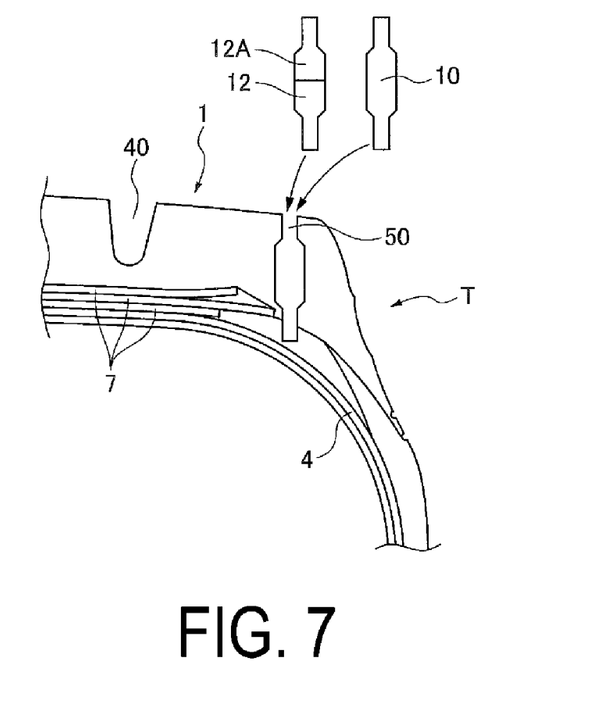
FIG. 7 is a diagram illustrating an example of a method for manufacturing a tire of an embodiment.
Figure 8A:
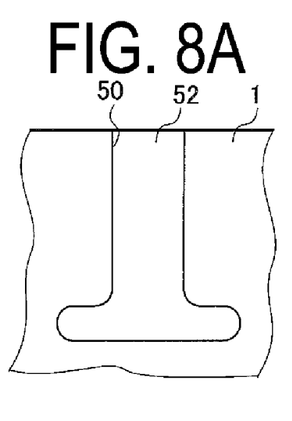
FIGS. 8A to 8H are diagrams illustrating a form of a magnet for measuring wear of an embodiment.
Figure 8B:
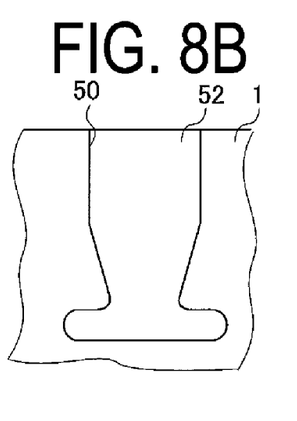
Figure 8C:
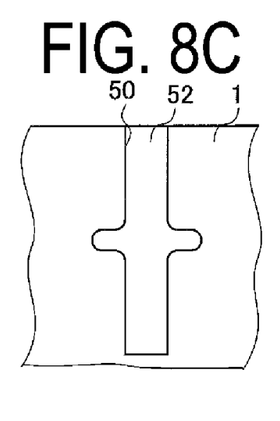
Figure 8D:
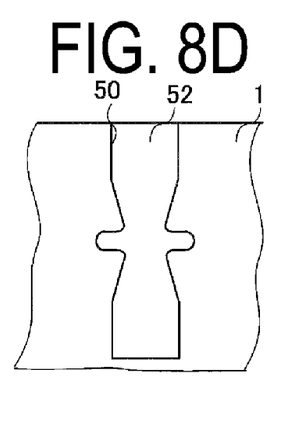
Figure 8E:
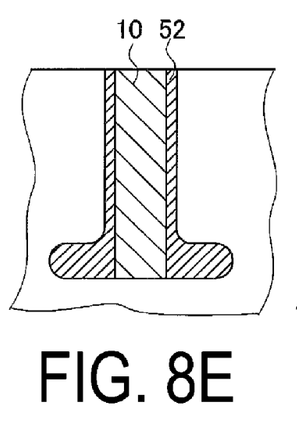
Figure 8F:
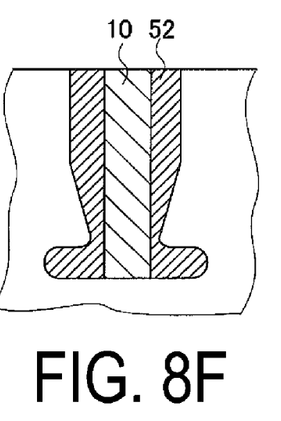
Figure 8G:
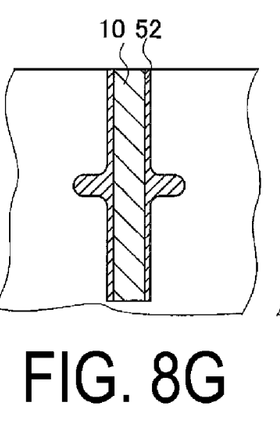
Figure 8H:
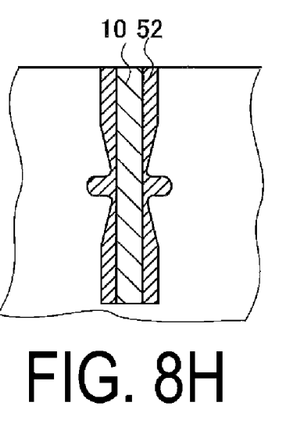

The tire T provided with the configuration described above may be manufactured by the following method for manufacturing a pneumatic tire. FIG. 7 is a diagram illustrating an example of a method for manufacturing a tire T of an embodiment.

More specifically, a tire is produced by vulcanizing a green tire using a tire mold in which pins not illustrated in the drawings are used to form two magnet mounting holes 50 for embedding the wear measurement magnet 10 and the reference magnet 12 in the tread rubber of the tread portion 1.

The wear measurement magnet 10 and the reference magnet 12 are mounted in the magnet mounting holes 50 of the tire T manufactured. The wear measurement magnet 10 and the reference magnet 12 illustrated in FIG. 7 are pressure fitted into the respective magnet mounting holes 50. During press fitting, when necessary, the wear measurement magnet 10 and the reference magnet 12 may be secured using an adhesive.

Note that a member 12A made of a rubber material identical to that of the tread rubber 1 is mounted to the end of the reference magnet 12, and is configured to have an identical shape as that of the wear measurement magnet 10.

The shape of the wear measurement magnet 10 and the combined body of the reference magnet 12 and the member 12A illustrated in FIG. 7 is larger than the cross section of the intermediate portion between both ends, compared with the cross section of both ends. This shape is configured to correspond with the shape of the magnet mounting holes 50. Such a shape makes it difficult for the pressed wear measurement magnet 10 and the combination of the reference magnet 12 and the member 12A to become separated from the magnet mounting holes 50.

FIGS. 8A to 8H are diagrams illustrating a form of a wear measurement magnet 10 of another embodiment. FIGS. 8E to 8H illustrate cross-sectional views of FIGS. 8A to 8D.

As illustrated in FIGS. 8A to 8D, the wear measurement magnet 10 is mounted in a cover member 52 made from a non-magnetic material having various external shapes. A cylindrical through hole is provided in the cover member 52, and the wear measurement magnet 10 is fixed by an adhesive or the like in the through hole. For example, a rubber material or a resin material having wear performance equivalent to that of the tread rubber 1 is preferably used as the non-magnetic material. The cylindrical wear measurement magnet 10 mounted in the cover member 52 is mounted via the cover member 52 in a magnet mounting hole 50 provided in the tread rubber 1 corresponding to the outer shape of the cover member 52. The cover member 52 has a cross sectional enlarged portion that is partially enlarged in cross section in the extension direction of the cover member 52, or has a cross-sectional enlarged portion provided between two cross-sectional reduced portions that are partially smaller in cross section in the extension direction of the cover member 52. The cross-sectional enlarged portion is mounted so as to be fitted into a corresponding portion in the magnet mounting hole 50 of the tread rubber 1 corresponding to the shape of the cross-sectional enlarged portion. Accordingly, even when a strong force is applied to the tread rubber 1 near the magnet mounting holes 50, the cylindrical shaped wear measurement magnet 10 and the reference magnet 12 do not easily disengage from the magnet mounting holes 50. At this time, the tread rubber 1 and the cover member 52 may be fixed with an adhesive in order to make it more difficult for the cover member 52 to become separated from the magnet mounting hole 50.

The reference magnet 12 may also be secured inside a cover member 52 illustrated in FIGS. 8A to 8H. In this case, as illustrated in FIG. 7, the reference magnet 12 and the member 12A may be combined and secured in the cover member 52.

Accordingly, when the wear measurement magnet 10 and the reference magnet 12 are mounted in the magnet mounting holes 50, the cover members 52 cover the outer periphery of each of the wear measurement magnet 10 and the reference magnet 12, and the integrated combination is preferably mounted in the magnet mounting hole 50, and the cover member 52 is preferably configured to contact the inner wall of the magnet mounting hole 50 inside the magnet mounting hole 50.

A pneumatic tire, a tire wear information acquisition system, and a pneumatic tire wear information acquisition method of embodiments of the present technology are described above in detail; however, the present technology is of course not limited to the above embodiments and may be enhanced or modified in various ways within a range without departing from the essence of the present technology.

The invention claimed is:

1. A pneumatic tire comprising a magnet for acquiring wear information regarding a tread portion, the pneumatic tire comprising:
   in the tread portion, a wear measurement magnet that is columnar and has magnetic flux density or magnetic field strength formed thereby decreased due to wear thereof along with wear of tread rubber of the tread portion, and a reference magnet that is columnar and provided at a position where the reference magnet is not worn along with wear of the tread rubber,
   the wear measurement magnet and the reference magnet extending from a tread surface side toward a tire cavity region of the pneumatic tire,
   a length in an extending direction of the reference magnet is shorter than a length in an extending direction of the wear measurement magnet, and
   an end of the reference magnet on the tread surface side being located farther from a tread surface where the tread portion contacts ground than an end of the wear measurement magnet on the tread surface side.

2. The pneumatic tire according to claim 1, wherein the reference magnet is disposed such that an end of the reference magnet on the tread surface side is not exposed to the tread surface, even when the tread surface reaches a wear limit curve that is a profile line of the tread surface where a wear indicator provided on the pneumatic tire begins to be exposed, while the tread rubber is worn, maintaining a profile shape of an unworn tread surface of when the pneumatic tire is new.

3. The pneumatic tire according to claim 1, wherein a circumferential main groove extending in a tire circumferential direction is provided in the tread portion, and
   the reference magnet is disposed such that an end of the reference magnet on the tread surface side is not exposed to the tread surface, even when the tread surface reaches a wear limit curve that is a profile line of the tread surface when the tread surface is worn until a groove depth of the circumferential main groove reaches 50% of a groove depth of an unworn circumferential main groove, while maintaining a profile shape of an unworn tread surface of when the pneumatic tire is new.

4. The pneumatic tire according to claim 1, wherein a portion from the end of the reference magnet on the tread surface side to the tread surface is formed from a rubber material that is identical to that of the tread rubber.

5. The pneumatic tire according to claim 1, wherein the wear measurement magnet and the reference magnet pass by an outer side of a belt layer in a tire lateral direction and extend toward the tire cavity region of the pneumatic tire.

6. The pneumatic tire according to claim 1, wherein the wear measurement magnet and the reference magnet are bonded magnets having a configuration in which magnet powder is included in rubber material that is identical to that of the tread rubber.

7. The pneumatic tire according to claim 1, wherein a ratio L/D is 3 to 15, the D being a maximum diameter of the wear measurement magnet and of the reference magnet, and the L being an extending length of the wear measurement magnet and of the reference magnet.

8. The pneumatic tire according to claim 1, wherein
the tread portion is provided with a plurality of shoulder lug grooves that extend inward in a tire lateral direction from a pattern end of the tread portion and are spaced apart in a tire circumferential direction;
the wear measurement magnet and the reference magnet are provided sandwiching at least one of the plurality of shoulder lug grooves in the tire circumferential direction; and
when a distance between two shoulder lug grooves adjacent to the wear measurement magnet and to the reference magnet in the tire circumferential direction is Y0, the wear measurement magnet and the reference magnet are respectively provided at positions separated from each of the two adjacent shoulder lug grooves by a distance 0.3 to 0.7 times the distance Y0.

9. The pneumatic tire according to claim 1, wherein the wear measurement magnet and the reference magnet are provided at different positions in a tire circumferential direction and at an identical position in a tire lateral direction.

10. The pneumatic tire according to claim 9, wherein a separation distance W, along the tire circumferential direction, between the wear measurement magnet and the reference magnet is greater than two times a length L of a longer length of lengths of the wear measurement magnet and the reference magnet.

11. The pneumatic tire according to claim 1, comprising:
a wear measurement magnetic sensor configured to detect a magnetic flux density or a magnetic field strength of the wear measurement magnet but not detect a magnetic flux density or a magnetic field strength of the reference magnet; and
a reference magnetic sensor configured to detect theft magnetic flux density or the magnetic field strength of the reference magnet but not detect the magnetic flux density or the magnetic field strength of the wear measurement magnet.

12. The pneumatic tire according to claim 11, wherein the wear measurement magnetic sensor and the reference magnetic sensor are provided on a protrusion made from a non-magnetic material protruding into the tire cavity region that is a space region that is filled with air and is defined by the pneumatic tire and a wheel that the pneumatic tire is mounted on from a tire inner surface facing the tire cavity region, and disposed within the space region.

13. The pneumatic tire according to claim 11, wherein
the wear measurement magnet and the reference magnet extend from the tread surface side toward the tire cavity region, and terminate before reaching a carcass ply of the pneumatic tire; and
the wear measurement magnetic sensor and the reference magnetic sensor are provided fixed to an inner surface of the pneumatic tire facing the tire cavity region that is a space region that is filled with air and is defined by the pneumatic tire and a wheel that the pneumatic tire is mounted on, and disposed within the space region.

14. A tire wear information acquisition system comprising:
a pneumatic tire; and
an acquisition device configured to acquire wear information regarding the tread from a detection signal of the wear measurement magnetic sensor and a detection signal of the reference magnetic sensor,
the pneumatic tire comprising a magnet for acquiring wear information regarding a tread portion, the pneumatic tire comprising:
in the tread portion, a wear measurement magnet that is columnar and has magnetic flux density or magnetic field strength formed thereby decreased due to wear thereof along with wear of tread rubber of the tread portion, and a reference magnet that is columnar and provided at a position where the reference magnet is not worn along with wear of the tread rubber,
a wear measurement magnetic sensor configured to detect a magnetic flux density or a magnetic field strength of the wear measurement magnet; and
a reference magnetic sensor configured to detect a magnetic flux density or a magnetic field strength of the reference magnet,
the wear measurement magnet and the reference magnet extending from a tread surface side toward a tire cavity region of the pneumatic tire,
an end of the reference magnet on the tread surface side being located farther from a tread surface where the tread portion contacts ground than an end of the wear measurement magnet on the tread surface side,
the detection signal of the wear measurement magnetic sensor including first information including a decrease in magnetic flux density or magnetic field strength of the wear measurement magnet due to the wear, aged deterioration, and thermal degradation of the wear measurement magnet,
the detection signal of the reference magnetic sensor including second information including a decrease in magnetic flux density or magnetic field strength of the reference magnet due to aged deterioration and thermal degradation of the reference magnet, and
the acquisition device being configured to acquire wear information regarding the tread rubber by removing a decrease in magnetic flux density or magnetic field strength of the wear measurement magnet due to the aged deterioration and the thermal degradation of the wear measurement magnet from a decrease in magnetic flux density or magnetic field strength of the wear measurement magnet by using the first information and the second information, and extracting information regarding the decrease in magnetic flux density or magnetic field strength of the wear measurement magnet due to the wear of the wear measurement magnet.

15. The tire wear information acquisition system according to claim 14, wherein the acquisition device is configured to extract information regarding the decrease in magnetic flux density or magnetic field strength due to the wear of the wear measurement magnet by dividing a detection signal of the wear measurement magnetic sensor by a computation result of arithmetic operations that are performed on the detection signal of the reference magnetic sensor with a constant value.

16. A pneumatic tire wear information acquisition method for a pneumatic tire comprising a magnet for acquiring wear information regarding a tread portion, the tread portion comprising a magnet for acquiring wear information regarding a tread portion, the tread portion comprising a wear measurement magnet that is columnar and having magnetic flux density or magnetic field strength formed thereby decreased due to wear thereof along with wear of tread rubber of the tread portion and a reference magnet that is columnar and provided at a position where the reference magnet is not worn with the wear of the tread rubber, the wear measurement magnet and the reference magnet extending from a tread surface side toward a tire cavity region of the pneumatic tire, an end of the reference magnet on the tread surface side being located farther from a tread surface where the tread portion contacts ground than an end of the wear measurement magnet on the tread surface side, the pneumatic tire wear information acquisition method comprising the steps of:

continuously or intermittently measuring a magnetic flux density or a magnetic field strength of the wear measurement magnet and a magnetic flux density or a magnetic field strength of the reference magnet; and acquiring wear information regarding the tread rubber by extracting information regarding a decrease in magnetic flux density or magnetic field strength due to the wear of the wear measurement magnet from information regarding the magnetic flux density or the magnetic field strength of the wear measurement magnet by referencing information regarding the magnetic flux density or the magnetic field strength of the reference magnet.

17. The pneumatic tire wear information acquisition method according to claim 16, wherein in the acquiring of the wear information regarding the tread rubber, information regarding the decrease in magnetic flux density or magnetic field strength due to the wear of the wear measurement magnet is extracted by dividing information regarding the magnetic flux density or the magnetic field strength of the wear measurement magnet by a computation result of arithmetic operations that are performed on information regarding the magnetic flux density or the magnetic field strength of the reference magnet with a constant value.

* * * * *